(12) United States Patent
Schneider et al.

(10) Patent No.: US 8,458,854 B2
(45) Date of Patent: Jun. 11, 2013

(54) DEVICE COMPRISING AT LEAST A BODY AND A BUMPER, AND ROBOT CLEANER COMPRISING SUCH A DEVICE

(75) Inventors: Ronald Maarten Schneider, Eindhoven (NL); Jan Willem Bruggers, Eindhoven (NL); Robertus Mathijs Gerardus Rijs, Eindhoven (NL); Jeroen Dekkers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 259 days.

(21) Appl. No.: 12/864,665

(22) PCT Filed: Jan. 23, 2009

(86) PCT No.: PCT/IB2009/050278
§ 371 (c)(1),
(2), (4) Date: Jul. 27, 2010

(87) PCT Pub. No.: WO2009/095830
PCT Pub. Date: Aug. 6, 2009

(65) Prior Publication Data
US 2010/0306932 A1 Dec. 9, 2010

(30) Foreign Application Priority Data
Feb. 1, 2008 (EP) .................................. 08150942

(51) Int. Cl.
*A47L 5/00* (2006.01)

(52) U.S. Cl.
USPC ............................................................ 15/325

(58) Field of Classification Search
USPC ............ 15/3, 300.1, 325, 327.1, 327.2, 327.3
See application file for complete search history.

(56) References Cited

U.S. PATENT DOCUMENTS

| 4,254,978 A | 3/1981 | Eshelman | |
|---|---|---|---|
| 5,903,124 A * | 5/1999 | Kawakami | 318/587 |
| 2005/0021181 A1 | 1/2005 | Kim et al. | |
| 2008/0229528 A1 * | 9/2008 | Chen et al. | 15/3 |

FOREIGN PATENT DOCUMENTS

| DE | 10102760 A1 | 7/2002 |
|---|---|---|
| EP | 0389459 A2 | 9/1990 |
| EP | 1582132 A2 | 10/2005 |
| WO | 03024292 A2 | 3/2003 |

* cited by examiner

*Primary Examiner* — Robert Scruggs

(57) ABSTRACT

A device (1) comprises at least a body (2) and a bumper (6) which is movably attached to the body so as to protect the body from shock caused by collision with an obstacle during movement of the device across a surface. The bumper is attached to the body by means of at least one spring (9) extending in a direction which is at least substantially perpendicular to the direction into which the bumper is movable with respect to the body. Furthermore, a robot cleaner comprising such a device is provided.

9 Claims, 4 Drawing Sheets

DEVICE COMPRISING AT LEAST A BODY AND A BUMPER, AND ROBOT CLEANER COMPRISING SUCH A DEVICE

FIELD OF THE INVENTION

The invention relates to a device comprising at least a body and a bumper which is movably attached to the body so as to protect the body from shock caused by collision with an obstacle during movement of the device across a surface.

The invention also relates to a robot cleaner comprising such a device.

The bumper reduces shock to the body but also to the obstacles.

BACKGROUND OF THE INVENTION

US2005/0021181 discloses a robot cleaner comprising such a device, wherein the body is motor-driven to move the robot cleaner across a surface. A semicircular ring-shaped bumper for mitigating shocks caused by sudden collisions with unexpected obstacles is attached to the body. The bumper is movable with respect to the body in one predetermined direction.

However, when a robot cleaner is moved across a surface, obstacles may be located anywhere so that the direction of impact may be in any direction parallel to the surface across which the robot cleaner is being moved.

Impact in a direction not parallel to the direction in which the bumper is movable with respect to the body may still cause damage to the body.

Such problems do not only occur with robot cleaners but also with other, motor-driven or manually driven devices that are movable across a surface.

Furthermore, the robot cleaner according to US-A1-2005/0021181 needs special guiding elements so as to guide the movement of the bumper with respect to the body.

OBJECT AND SUMMARY OF THE INVENTION

It is an object of the invention to provide a device wherein the movement and guidance of the bumper with respect to the body is realized in a simple manner.

This object is achieved by the device according to the invention in that the bumper is attached to the body by means of at least one spring extending in a direction which is at least substantially perpendicular to the direction into which the bumper is movable with respect to the body.

Due to the fact that the spring extends at least substantially perpendicularly to the direction into which the bumper is movable, the spring will be bent when the bumper is moved with respect to the body. If the spring is bendable in all directions parallel to the surface across which the body is movable, the bumper will also be movable with respect to the body in all of these directions.

Furthermore, the spring functions as a guiding means for the movement of the bumper with respect to the body so that no separate guiding means are necessary.

If the spring is a coil spring, the guidance is realized by the windings of the coil spring which slide over each other.

An embodiment of the device according the invention is characterized in that the bumper is at least substantially ring-shaped and at least substantially surrounds the body.

With such a bumper, the body is protected all round, while the bumper is movable with respect to the body in all directions extending parallel to the surface. The distance through which the bumper is movable in each direction depends on the spacing between the bumper and the body in each direction.

Another embodiment of the device according to the invention is characterized in that the bumper is attached to the body by means of at least three springs extending parallel to each other and being at least substantially perpendicular to the direction into which the bumper is movable with respect to the body.

The at least three springs ensure a good connection and support of the bumper with respect to the body.

A further embodiment of the device according to the invention is characterized in that the spring is a pretensioned tension spring.

Such pretensioned tension springs are obtainable with all kinds of force-displacement characteristics when being bent so that an optimized spring can be found for any specific desired behavior of the bumper with respect to the body. Furthermore, such a type of spring presses the windings against each other so that they provide satisfactory guidance for the movement of the bumper with respect to the body.

Another embodiment of the device according to the invention is characterized in that the spring has a relatively large stiffness at forces below a predetermined value and a relatively small stiffness at forces above the predetermined value.

With such characteristic features of the spring, the bumper will be moved only slightly with respect to the body if, for example, the body accelerates. However, as soon as the bumper hits an object with a force on the bumper that is larger than the predetermined value, the spring exhibits a relatively small stiffness, thus facilitating easy movement of the bumper with respect to the body so that the body is well protected. The bumper is preferably movable with respect to the body through a predetermined distance, with the relatively large stiffness occurring through at least 20 percent of the predetermined distance. In operation, the stiffness must be relatively large through a distance which is as short as possible, up to a certain force level. The stiffness will be small above this force level.

Yet another embodiment of the device according to the invention is characterized in that the device comprises at least one sensor for detecting a displacement of the bumper with respect to the body, and stopping means for stopping the movement of the body if the detected displacement is larger than a predetermined displacement.

In this manner, further movement of the body is prevented so that it will not be damaged.

A further embodiment of the device according to the invention is characterized in that the body comprises a funnel-shaped surface on which an element, which is connected to the bumper by means of the spring, is slidable or rollable.

Such a funnel-shaped surface causes the element to slide or roll to the lowest point of the funnel that is considered to be the initial position. As soon as the bumper is hit, the bumper together with the spring and the element will be moved with respect to the funnel-shaped surface so that the element slides or rolls on the funnel-shaped surface to a position that is higher than the lowest point. As soon as the external force on the bumper is removed, the element will slide or roll back on the funnel-shaped surface to the lowest point so that also the spring and the bumper attached to the element return to their initial position.

The invention also relates to a robot cleaner comprising a device as described hereinbefore. The body is motor-driven by such a robot cleaner and is moved across the surface in either a predetermined or a random pattern. During movement across the surface, obstacles may be hit. In such a case, the bumper is moved with respect to the body so that the spring is bent. The movement is preferably detected by means of a sensor, after which the body is stopped.

BRIEF DESCRIPTION OF THE DRAWINGS

The invention will now be explained in more detail with reference to the accompanying drawings, in which.

DESCRIPTION OF EMBODIMENTS

Figure 1A:
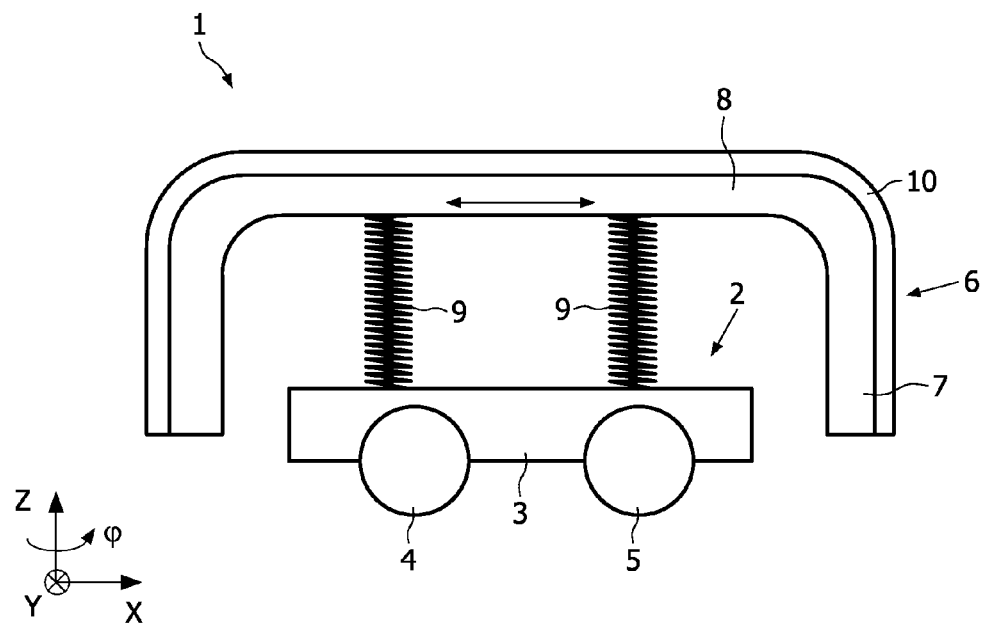
FIG. 1A is a cross-section of a device according to the invention.

In the Figures, identical parts are denoted by the same reference numerals.

Figure 1B:
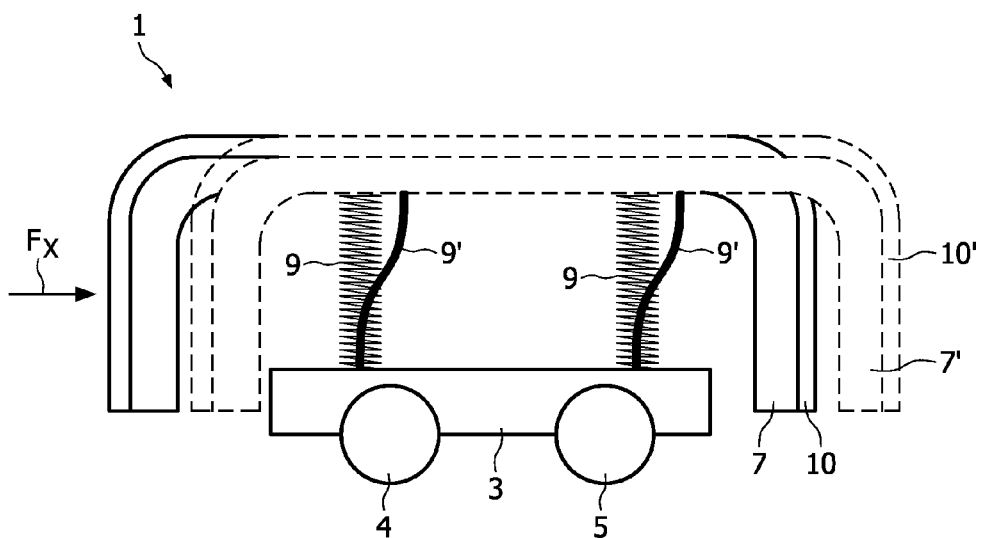
FIG. 1B is a cross-section of the device shown in FIG. 1A with the bumper shown in two different positions with respect to the body.
Figure 2:
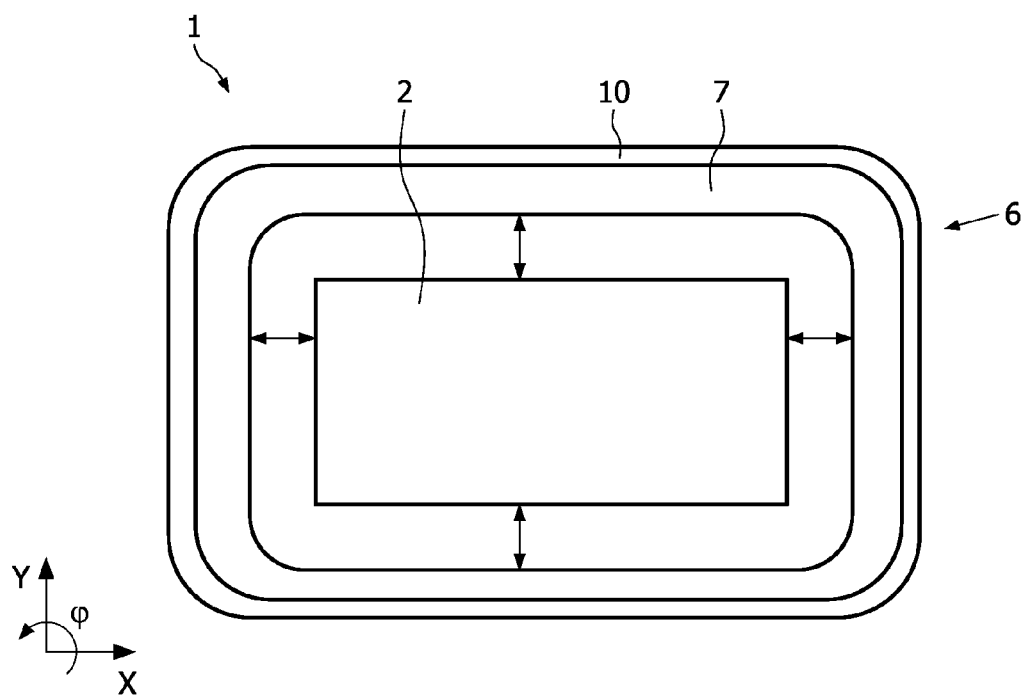
FIG. 2 is a cross-sectional plan view of the device shown in FIG. 1A.

FIGS. 1A, 1B and 2 show a device 1 according to the invention, comprising a motor-driven body 2 with a housing 3 and two pairs of running wheels 4, 5 located on opposite sides of the housing 3. The device 1 also comprises a bumper 6 which is connected to the body 2 by means of four vertically extending coil springs 9. The bumper 6 comprises a ring-shaped part 7 surrounding the body 2 and being located at a distance from the body 2, which ring-shaped part 7 is connected to a cover part 8 to which the springs 9 are connected. The outer surface of the bumper 6 is provided with a sensor layer 10, the function of which will be described below.

As can clearly be seen from FIG. 2, the distances between the ring-shaped part 7 and the body 2 on both sides of the body 2 are similar. Also the distances in the X-direction and the Y-direction are similar. However, the distances in the X-direction and the Y-direction may differ, depending on, for example, the available space for the body 2 and the bumper 6, and on the expected impact forces in the different directions.

Figure 3:
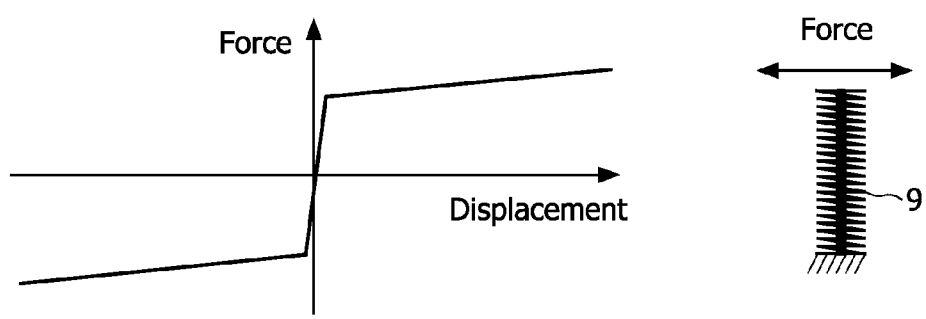
FIG. 3 is a diagram showing the spring characteristic of a pretensioned tension coil spring while being bent.

FIG. 3 shows a vertically extending pretensioned tension coil spring 9 on which a force is exerted in the direction indicated by the double arrow. Due to this force, the spring 9 will be bent so that windings of the spring 9 will slide over each other and be moved with respect to each other. A typical force-displacement characteristic of such a spring 9 is shown in the diagram, in which the spring 9 has a relatively large stiffness at relatively low forces, defined as force divided by displacement. After a certain displacement, only a relatively small force is needed to obtain a relatively large displacement of the spring 9. In this part of the diagram, the spring 9 has a relatively small stiffness. As soon as the force on the spring 9 is removed, the spring 9 will return to its initial position under the influence of the internal forces.

Figure 4:
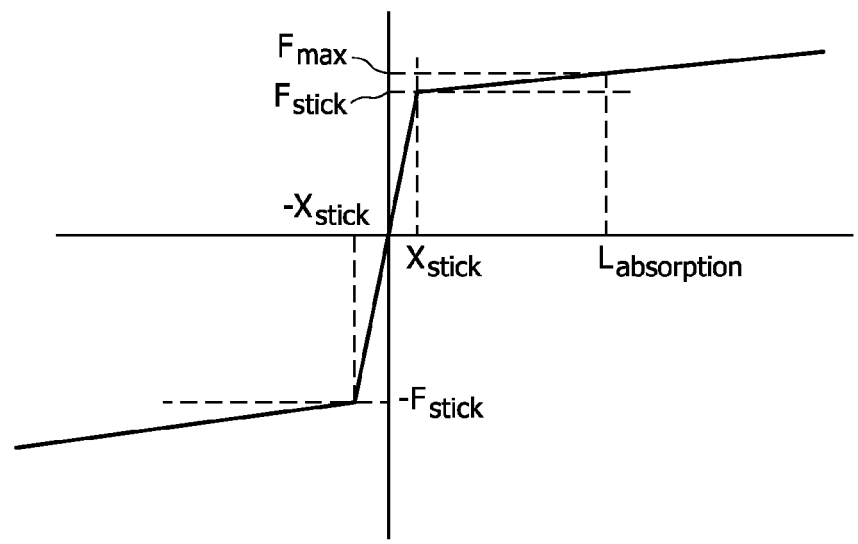
FIG. 4 shows a spring characteristic similar to that shown in FIG. 3.

FIG. 4 shows a diagram similar to that shown in FIG. 3, indicating values of the displacement and force.

When the device 1 is moved across a surface by means of the motor-driven body 2, it is desirable that the bumper 6 does not vibrate too much with respect to the body 2.

This is desirable from an aesthetic point of view but also from the point of view of controlling the movements. It is therefore desirable that the springs 9 exhibit a relatively large stiffness so as to limit the displacement of the bumper 6 with respect to the body 2 during normal movement of the body 2 across the surface. During such normal movements, the force exerted by the bumper 6 on the springs 9 must be smaller than $F_{stick}$, wherein $F_{stick}$ must be larger than the mass $M_{bumper}$ multiplied by the maximum acceleration $A_{max}$ of the body 2. In a practical situation, a margin of a factor of 3 is introduced to take account of, for example, out-of-roundness of the wheel, etc., which can introduce additional vibrations and, consequently, accelerations.

In one example, $F_{stick}$ is 2 N, while $X_{stick}$ is 0.2 mm so that the stiffness at near-zeroforces is 10 N/mm.

As soon as the bumper hits an obstacle during movement of the body 2 across the surface, for example, a force $F_x$ is exerted on the bumper 6 (see FIG. 1B), due to which the bumper 6 is moved from its initial position to the position shown in broken lines in FIG. 1B. The springs 9 are then bent to a shape denoted by 9'.

The bumper 6 will only move with respect to the body 2 if $F_x$ is larger than $F_{stick}$. As soon as the sensor layer 10 is touched by the obstacle, a processor (not shown) will send a signal to the motor-driven body 2 so that the movement of the body 2 will be stopped, reversed or changed. During this process, the body 2 will be moved a little further into the direction of the obstacle, whereby the bumper 6 will be moved with respect to the body 2 until it abuts against the body 2. The bumper 6 has then moved with respect to the body 2 through a distance $L_{absorption}$ at which the maximally allowable force $F_{max}$ on the bumper 6 has occurred.

$L_{absorption}$ depends on safety/damage criteria, velocity and braking properties of the device. For a 4-kg device travelling at 0.3 m/sec., an absorption distance $L_{absorption}$ of 10 mm was found to be sufficient. For such a 4-kg device with $L_{absorption}$ being 10 mm, 4 N was found to be an appropriate value for $F_{max}$.

Since the springs 9 cannot only be bent in the X-direction but also in the Y-direction, the bumper 6 can be moved with respect to the body in the X-, Y- and φ-directions.

Figure 5:
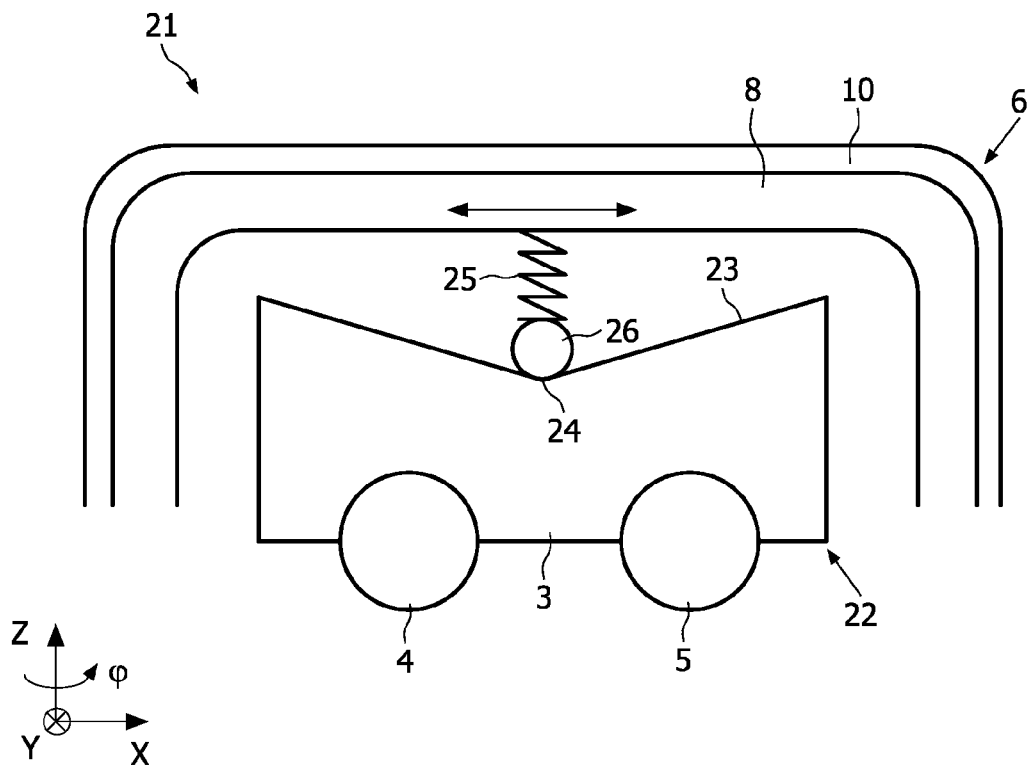
FIG. 5 is a cross-section of a further embodiment of the device according to the invention.

FIG. 5 shows another embodiment of the device 21 according to the invention, comprising a bumper 6 similar to the bumper 6 of the device 1. The device 21 also comprises a body 22 which has a funnel-shaped surface 23 at least in the X-direction but preferably also in the Y-direction so that a real funnel is obtained. The funnel-shaped surface 23 has a lowest point 24. A spring 25 extending in the Z-direction is connected to the bumper 6. One side of the spring 25 remote from the bumper 6 is connected to a ball 26 which is rollable across the funnel-shaped surface 23.

When the body 22 is moved across a surface and an obstacle is hit, the bumper 6 will be displaced with respect to the body 22 so that the ball 26 will roll across the surface 23 from the lowest point 24 in the upward direction. As soon as the force exerted by the obstacle is removed, the bumper 6 will return to its initial position.

It is also possible to have other types of funnel-shaped surfaces 23, with point 24 being the lowest point. The surface 23 may have a sharp gradient first, followed by a small gradient. This will have the same effect as a large stiffness and a small stiffness.

It is also possible to use other types of springs having different force-displacement characteristics, depending on the desired movement of the bumper 6 with respect to the body 2. For example, a spring can be used which has a constant stiffness for all forces.

Figure 6A:
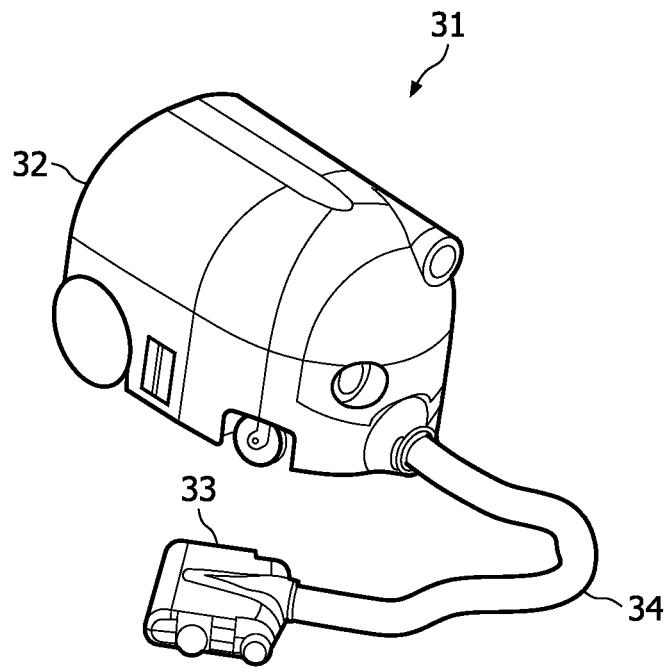
FIGS. 6A and 6B are a front perspective view and a rear perspective view, respectively, of an embodiment of a robot cleaner according to the invention.
Figure 6B:
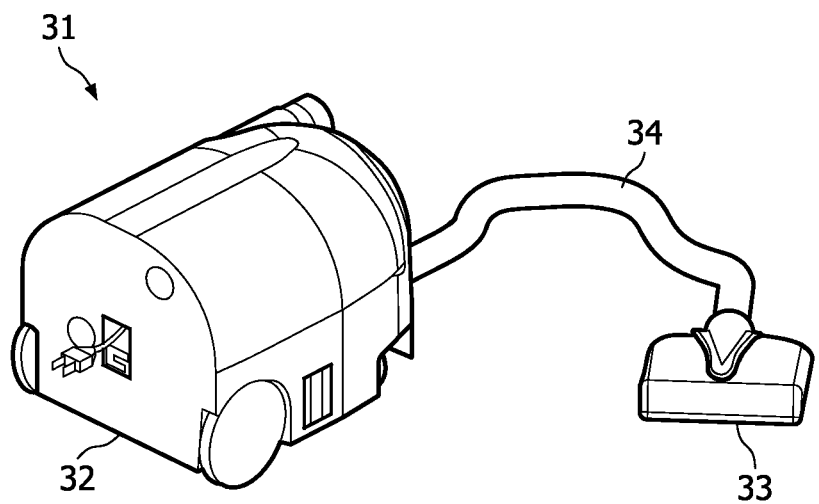

FIGS. 6A and 6B show an embodiment of a robot cleaner 31 according to the invention, comprising two major assemblies analogous to a standard vacuum cleaner: a module 32 comprising a fan module and dust container, and a cleaning head module 33 connected to the module 32 via a hose 34. The modules 32, 33 can be considered as bodies that are movable across a surface. Each module 32, 33 is provided with a bumper 6 as shown in FIGS. 1A, 1B and 2 so as to reduce, in operation, shocks to the body when an obstacle is hit. The bumper also reduces shocks to the obstacles.

The bumper 6 is not visible in FIGS. 6A and 6B. The bumper 6 will at least substantially surround the body of the modules 32, 33, thus leaving a space for the hose 34.

In summary, a device comprises at least a body and a bumper which is movably attached to the body so as to protect the body from shock caused by collision with an obstacle during movement of the device across a surface. The bumper is attached to the body by means of at least one spring extending in a direction which is at least substantially perpendicular to the direction into which the bumper is movable with respect to the body. Furthermore, a robot cleaner comprising such a device is provided.

It will be evident to a person skilled in the art that the scope of the present invention is not limited to the examples described hereinbefore, but that several amendments and modifications thereof are possible without departing from the scope of the present invention as defined in the appending claims. While the present invention has been illustrated and described in detail in the Figures and the description, such illustrations and descriptions are given by way of example only and are not to be considered as restrictive. The present invention is not limited to the disclosed embodiments. Variations of the disclosed embodiments can be understood and effected by a person skilled in the art in practicing the claimed invention, from a study of the Figures, the description and the appending claims. In the claims, use of the verb "comprise" and its conjugations does not exclude steps or elements other than those stated in a claim, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

The invention claimed is:

1. A device comprising:
    at least a body; and
    a bumper which is movably attached to the body so as to protect the body from shock caused by collision with an obstacle during movement of the device across a surface, wherein the bumper is attached to the body via at least one spring extending in a direction which is at least substantially perpendicular to the direction into which the bumper is movable with respect to the body, wherein the at least one spring (a)(i) guides movement of the bumper with respect to the body so that no separate guides are necessary and (a)(ii) will be bent in response to the bumper being moved with respect to the body, the at least one spring being bendable in all directions parallel to the surface so that the bumper is moveable with respect to the body in all X-, Y-, and $\phi$-directions parallel to the surface across which the device is movable, wherein the body further comprises a funnel-shaped surface having a lowest point and on which an element, which is connected to the bumper via an end of the at least one spring remote from the bumper, is slidable or rollable across the funnel-shaped surface (b)(i) from an initial position at the lowest point, in an upward direction, in response to a force exerted on the bumper that causes displacement of the bumper with respect to the body (b)(ii) to the initial position in response to removal of the force exerted on the bumper.

2. The device according to claim 1, wherein the bumper is at least substantially ring-shaped and at least substantially surrounds the body.

3. The device according to claim 1, further wherein the at least one spring extends perpendicularly to the surface.

4. The device according to claim 1, wherein the bumper is attached to the body via at least three springs extending parallel to each other and being at least substantially perpendicular to the direction into which the bumper is movable with respect to the body.

5. The device according to claim 1, wherein the spring is a pretensioned tension spring.

6. The device according to claim 1, wherein the spring has a relatively large stiffness at forces below a predetermined value and a relatively small stiffness at forces above the predetermined value.

7. The device according to claim 6, further wherein the bumper is movable with respect to the body through a predetermined distance, with the relatively large stiffness occurring through at least 20 percent of the predetermined distance.

8. The device according to claim 1, the device further comprising at least one sensor for detecting a displacement of the bumper with respect to the body, and stopping means for stopping the movement of the body if the detected displacement is larger than a predetermined displacement.

9. A robot cleaner comprising a device according to claim 1, wherein the body is motor-driven.

* * * * *